(12) United States Patent
Ebel

(10) Patent No.: US 10,661,851 B2
(45) Date of Patent: May 26, 2020

(54) LIGHTING DEVICE FOR AN AT LEAST PARTIALLY MUSCLE-POWERED VEHICLE BY MEANS OF LIGHT-GUIDING ELEMENTS

(71) Applicant: Matthias Ebel, München (DE)

(72) Inventor: Matthias Ebel, München (DE)

( * ) Notice: Subject to any disclaimer, the term of this patent is extended or adjusted under 35 U.S.C. 154(b) by 12 days.

(21) Appl. No.: 15/301,021

(22) PCT Filed: Mar. 31, 2015

(86) PCT No.: PCT/EP2015/000703
§ 371 (c)(1),
(2) Date: Sep. 30, 2016

(87) PCT Pub. No.: WO2015/149943
PCT Pub. Date: Oct. 8, 2015

(65) Prior Publication Data
US 2017/0021884 A1    Jan. 26, 2017

(30) Foreign Application Priority Data
Mar. 31, 2014   (DE) .......................... 10 2014 004 698

(51) Int. Cl.
*B62J 6/02*      (2020.01)
*B62J 6/04*      (2020.01)
(Continued)

(52) U.S. Cl.
CPC . *B62J 6/02* (2013.01); *B62J 6/04* (2013.01); *B62J 6/18* (2013.01); *G02B 6/0006* (2013.01); *G02B 6/0008* (2013.01); *B62J 11/00* (2013.01)

(58) Field of Classification Search
CPC ....... B62J 11/00; B62J 6/02; B62J 6/04; B62J 6/18; G02B 6/0006; G02B 6/0008
See application file for complete search history.

(56) References Cited

U.S. PATENT DOCUMENTS

| 3,933,409 | A | * | 1/1976 | Kloots | G02B 6/2804 |
| | | | | | 385/45 |
| 4,089,583 | A | * | 5/1978 | Auracher | G02B 6/2804 |
| | | | | | 385/31 |

(Continued)

FOREIGN PATENT DOCUMENTS

| DE | 8520553 | 10/1985 |
| DE | 9003897 | 6/1990 |

(Continued)

OTHER PUBLICATIONS

International Search Report dated Jul. 6, 2015 in International (PCT) Patent Application No. PCT/EP2015/000703.

(Continued)

*Primary Examiner* — Tsion Tumebo
(74) *Attorney, Agent, or Firm* — Onello & Mello, LLP.

(57) ABSTRACT

The present invention comprises an illumination device (1210) of a vehicle which is operated at least partially by human power, having at least one light guide element (1220) and one mounting device which is adapted to accommodate an external light source in such a manner that the light which is emitted by the light source can be fed at least partially into the light guide element (1220) and can exit from the light guide element (1220) in such a manner that the emerging light can serve as illumination for the vehicle which is operated at least partially by human power. The present invention further comprises a method for controlling the illumination device of vehicles which are operated at least partially by human power, and trailers thereof, and also an application for controlling the illumination device of vehicles which are operated at least partially by human power, and trailers thereof.

16 Claims, 14 Drawing Sheets

(51) Int. Cl.
*F21V 8/00* (2006.01)
*B62J 6/18* (2006.01)
*B62J 11/00* (2020.01)

(56) References Cited

U.S. PATENT DOCUMENTS

| | | | | |
|---|---|---|---|---|
| 4,243,297 A * | 1/1981 | Elion | ............... | G02B 6/2938 |
| | | | | 385/24 |
| 4,422,719 A | 12/1983 | Orcutt | | |
| 4,712,858 A * | 12/1987 | Presby | ............... | G02B 6/2552 |
| | | | | 264/1.27 |
| 4,901,209 A * | 2/1990 | Nitz | ............... | B62J 6/00 |
| | | | | 280/281.1 |
| 5,446,628 A | 8/1995 | Blom et al. | | |
| 6,336,736 B1 * | 1/2002 | Edmond | ............... | B62J 6/00 |
| | | | | 362/473 |
| 6,731,202 B1 * | 5/2004 | Klaus | ............... | B60Q 1/525 |
| | | | | 340/425.5 |
| 6,752,516 B1 * | 6/2004 | Beadle | ............... | F21V 21/10 |
| | | | | 362/191 |
| 7,586,405 B1 * | 9/2009 | Brandenburg | ............... | B60Q 1/18 |
| | | | | 250/336.1 |
| 8,325,027 B2 * | 12/2012 | Tee | ............... | A42B 3/044 |
| | | | | 340/321 |
| 8,626,399 B2 * | 1/2014 | Takeuchi | ............... | B62K 11/007 |
| | | | | 701/49 |
| 8,643,722 B2 * | 2/2014 | Solida | ............... | B62J 99/00 |
| | | | | 348/148 |
| 8,974,098 B2 * | 3/2015 | McCaslin | ............... | B62J 6/02 |
| | | | | 362/184 |
| 9,610,994 B2 * | 4/2017 | Peterson | ............... | B62K 19/40 |
| 9,630,669 B2 * | 4/2017 | Slaughter | ............... | B62J 6/001 |
| 9,656,602 B2 * | 5/2017 | Needham | ............... | H04N 9/3173 |
| 9,661,200 B2 * | 5/2017 | O'Neill | ............... | H04N 5/2254 |
| 2003/0067782 A1 * | 4/2003 | Niezrecki | ............... | B62J 6/20 |
| | | | | 362/473 |
| 2006/0109680 A1 | 5/2006 | Peng et al. | | |
| 2007/0285934 A1 * | 12/2007 | Carillo | ............... | B62J 6/00 |
| | | | | 362/473 |
| 2008/0101079 A1 * | 5/2008 | Kitamura | ............... | B62J 6/001 |
| | | | | 362/473 |
| 2008/0219014 A1 * | 9/2008 | Loibl | ............... | B62J 6/00 |
| | | | | 362/473 |
| 2010/0283590 A1 * | 11/2010 | Tee | ............... | A42B 3/044 |
| | | | | 340/432 |
| 2010/0309454 A1 * | 12/2010 | Zhang | ............... | G01J 3/02 |
| | | | | 356/39 |
| 2013/0083185 A1 | 4/2013 | Coleman, III | | |
| 2013/0148375 A1 * | 6/2013 | Connor | ............... | B62J 6/16 |
| | | | | 362/554 |
| 2014/0153272 A1 * | 6/2014 | Giraud | ............... | F21S 43/14 |
| | | | | 362/511 |
| 2014/0268376 A1 * | 9/2014 | O'Neill | ............... | G03B 17/565 |
| | | | | 359/827 |
| 2015/0146449 A1 * | 5/2015 | Freiser | ............... | B62J 6/04 |
| | | | | 362/523 |
| 2015/0172522 A1 * | 6/2015 | O'Neill | ............... | H04N 5/2252 |
| | | | | 348/240.3 |
| 2015/0197308 A1 | 7/2015 | Butora et al. | | |

FOREIGN PATENT DOCUMENTS

| | | |
|---|---|---|
| DE | 202004001297 | 4/2004 |
| DE | 202007006765 | 8/2007 |
| GB | 2037969 | 7/1980 |
| TW | 384472 | 7/2010 |
| TW | 431116 | 6/2012 |
| TW | 201404646 | 2/2014 |
| WO | 03093092 | 11/2003 |
| WO | 2014029759 | 2/2014 |

OTHER PUBLICATIONS

Australian Office Action dated Feb. 16, 2018 issued in corresponding Australian Application No. 2015240068.

* cited by examiner

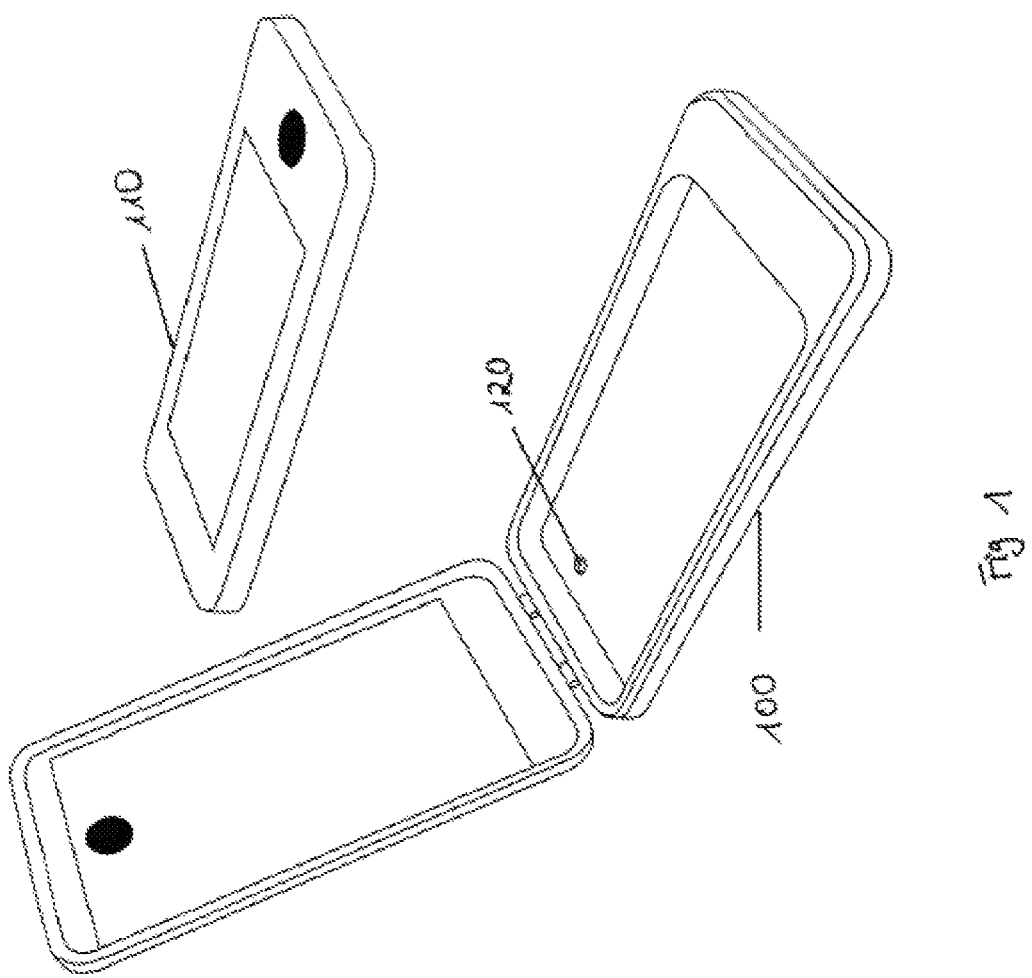

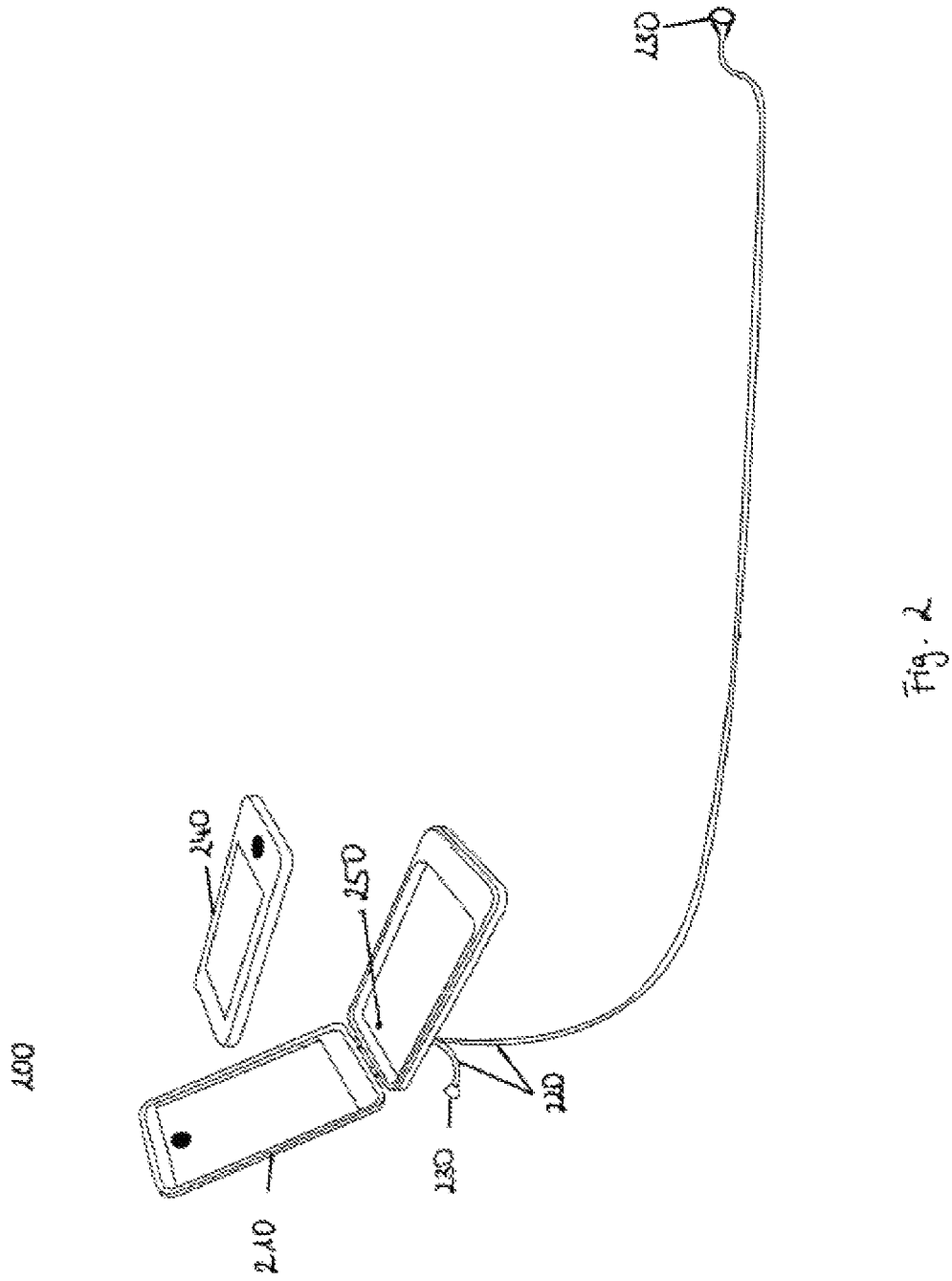

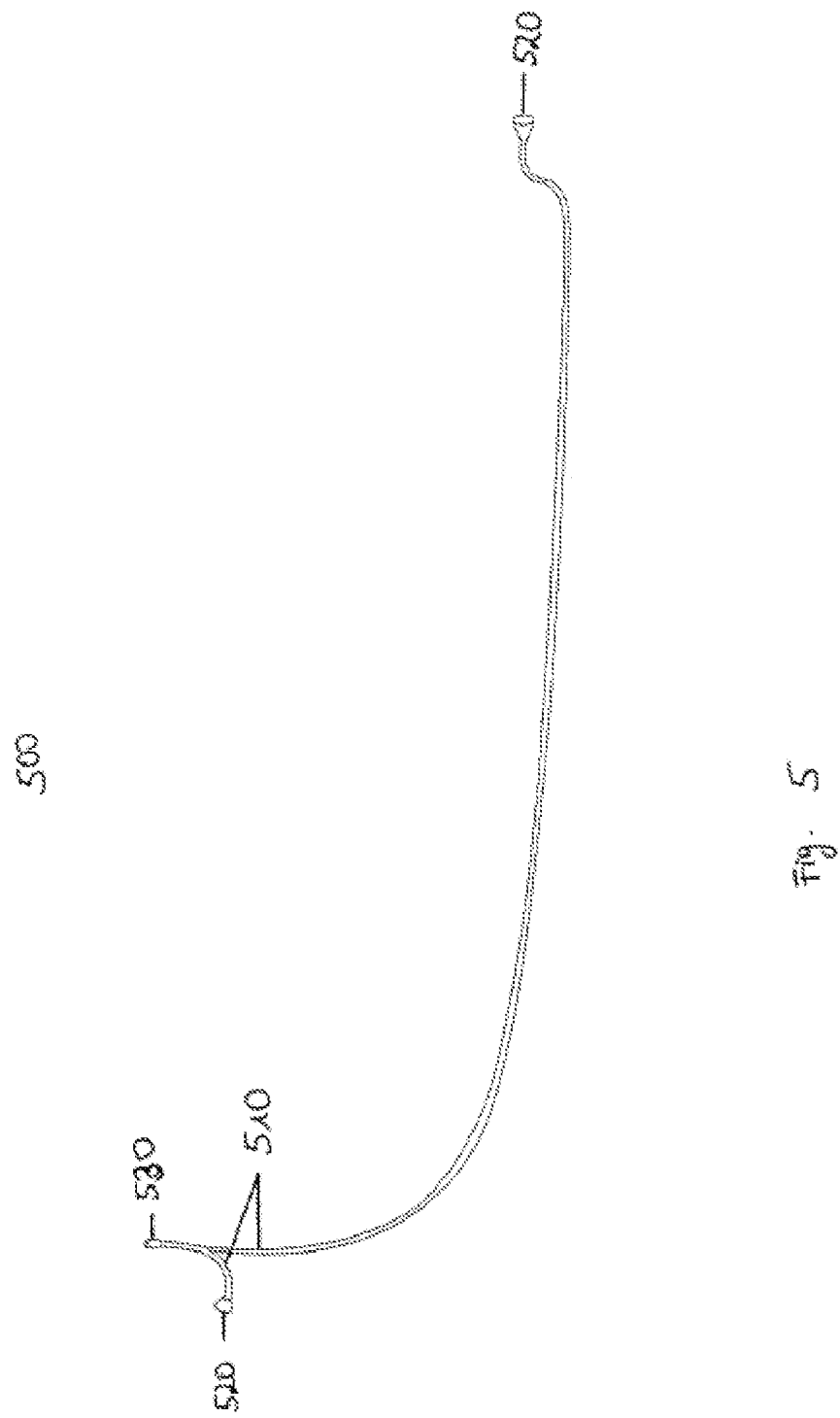

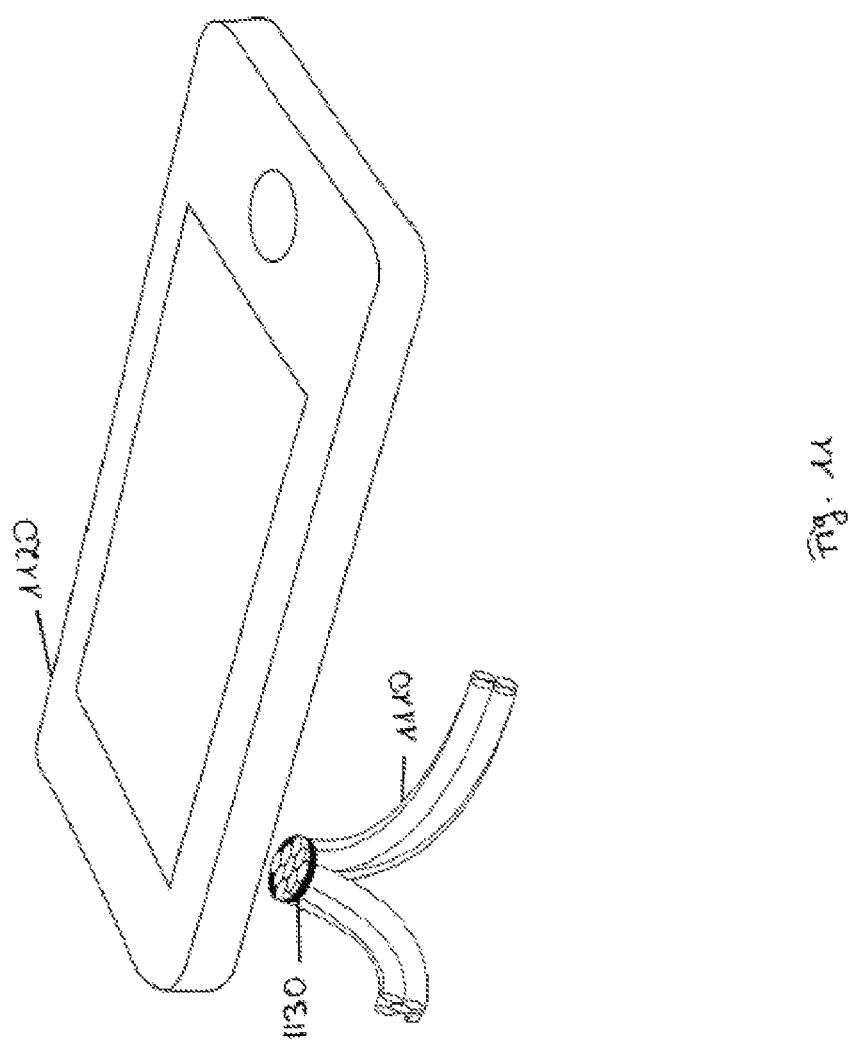

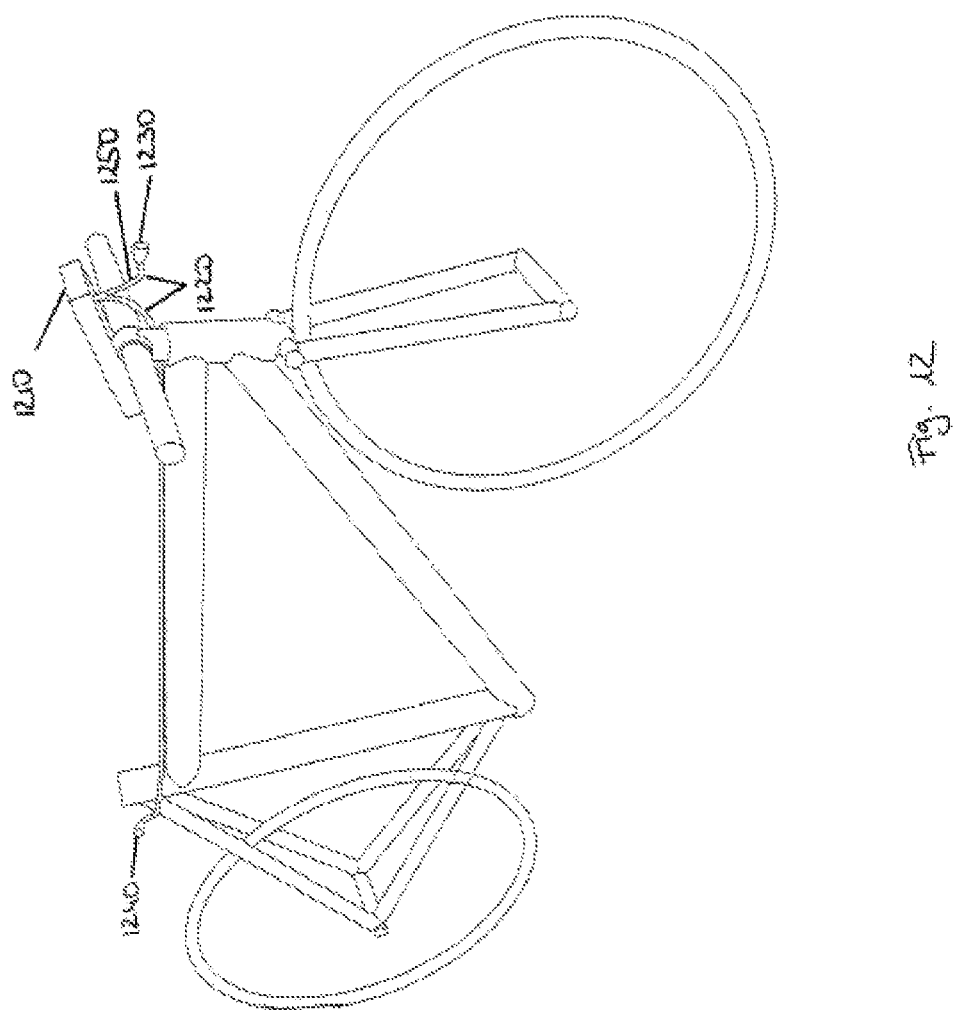

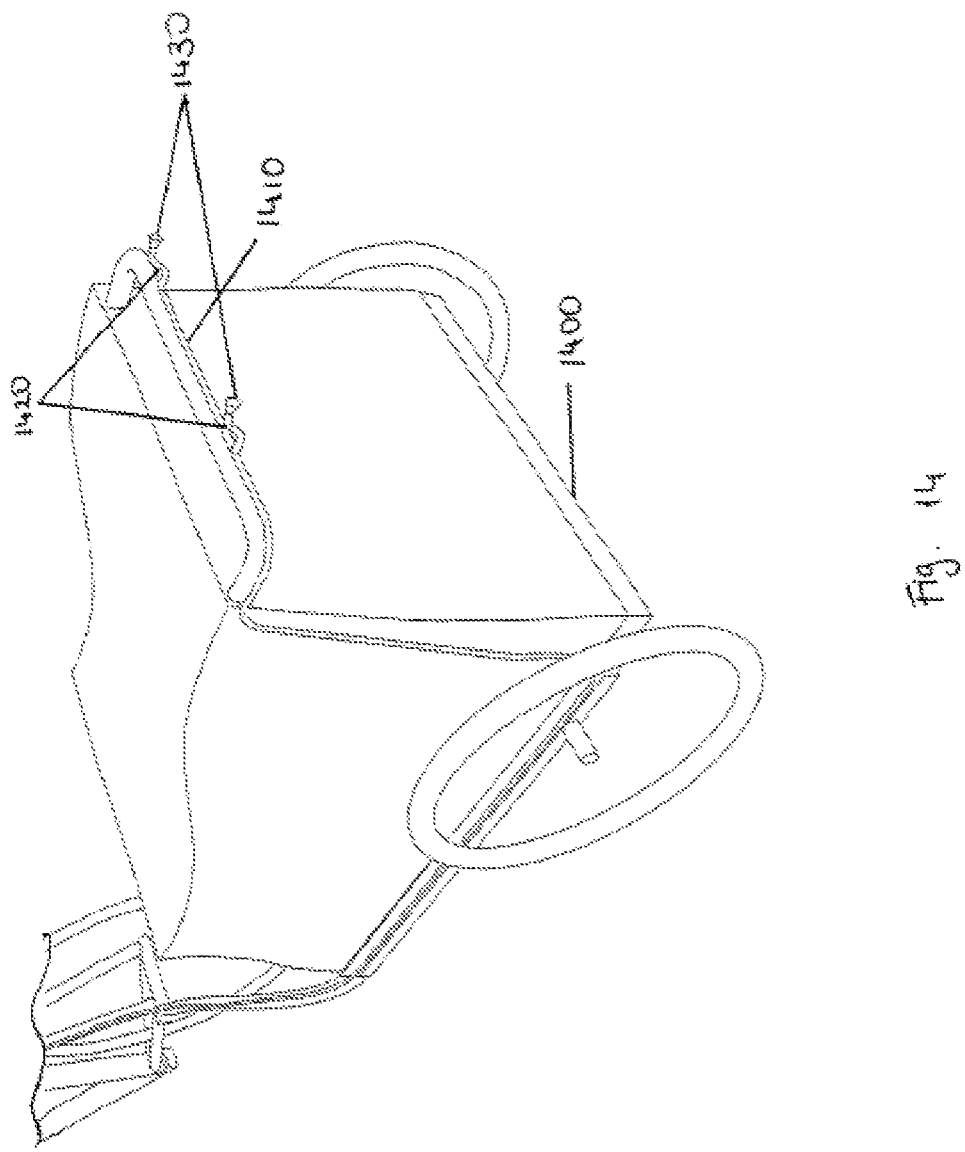

US 10,661,851 B2

LIGHTING DEVICE FOR AN AT LEAST PARTIALLY MUSCLE-POWERED VEHICLE BY MEANS OF LIGHT-GUIDING ELEMENTS

BACKGROUND

The present invention relates to an illumination device of vehicles which are operated at least partially by human power, in particular bicycles, as well as their trailers, by using light guide elements and a central light source, to a method for controlling the illumination device of vehicles which are operated at least partially by human power, and their trailers, and to an application/app for controlling the illumination device of vehicles which are operated at least partially by human power, and their trailers.

Cyclists and electric bike riders expose themselves in street traffic to particular risks, since they can be easily overlooked by motor vehicle drivers as "weaker" road users. To minimize such risks, a bicycle rider has the option of equipping his bicycle with an illumination device. These are usually a front and a rear light, wherein the same are attached to the ends of the bicycle. This illumination device is supplied with current by a permanently installed dynamo. In addition, it is possible to attach the illumination device to the bicycle by means of battery-/accumulator-powered, detachable systems.

Permanently installed front and rear lights, in combination with a permanently installed dynamo, have the disadvantage that they are constantly exposed to the weather. For this reason, they wear out very quickly, which results in inconsistent functionality of the illumination device. In addition, the use of a permanently installed dynamo has the disadvantage that its use involves increased energy- and/or power expenditure. Another disadvantage is that two separate light sources and/or luminous elements are needed for its operation.

Removable battery-accumulator-powered illumination devices, on the other hand, have the disadvantage that cyclists simply forget to remove them from the bicycle during daylight hours when there is sufficient light all around. This makes these illumination devices very vulnerable to theft. The result is that, when needed—that is, during daylight and night hours where the ambient light is not sufficient—no illumination is available for the corresponding bicycle. A further disadvantage of battery/accumulator-powered illumination devices is that their function depends on the presence of batteries and/or charged accumulators. If a cyclist forgets to make arrangements to ensure that such an illumination device is functional and/or remains functional, the result is likewise that, when needed—that is, during daylight and night hours where the ambient light is not sufficient—no illumination is available for the corresponding bicycle. It is also disadvantageous that two separate light sources and/or luminous elements are required for the operation.

A further disadvantage of both common illumination systems is that an extension of their functions is not intended, and thus they cannot be expanded, and/or can only be expanded with disproportionate additional costs. Furthermore, common illumination systems cannot be controlled by the illumination device simply being manually switched on and/or off.

A mobile terminal is a device which is capable of wireless communication in a mobile network, via local networks and/or Local Area Networks (LANs), such as Wireless Fidelity (Wi-Fi), or via Wide Area Networks (WANs) such as Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long Term Evolution (LTE), or World Wide Interoperability for Microwave Access (WIMAX). A communication via further, common or future communication technologies is possible. The term mobile terminal includes in particular smartphones, but also other mobile phones or cell phones, personal digital assistants (PDAs), tablet PCs, and all other current and future electronic devices which are equipped with appropriate technologies for the provision of an external light source for the above-mentioned illumination device and/or for controlling the above-mentioned illumination device.

In particular, almost all mobile terminals or smartphones available today are equipped with a camera function, in order to take pictures and movies. To be sure of providing the best possible quality of the images recorded by smartphones, most smartphones are also equipped with a light source which can be used both as a flash for image capture and as a continuous light. As such, applications/apps, for example, are available for common operating systems for smartphones, which can serve as illumination and/or a flashlight for the user. Furthermore, mobile terminals which are common today have an acceleration sensor that can determine, for example, whether an increase or decrease in speed occurs, by detecting a value which is representative of the acceleration. In addition, mobile terminals which are common today also have a Global Positioning System (GPS) sensor which is able to capture representative position data for a position. This position data can then be displayed on a map integrated into the mobile terminal, by way of example. In addition, mobile terminals which are common today have an integrated light sensor and/or photocell which is able to detect a value representative of the ambient brightness. This value can be used, by way of example, to adjust a brightness of a display of the mobile terminal to the detected ambient brightness.

SUMMARY

The problem addressed by the present invention is that of replacing and/or supplementing the illumination device of bicycles in a simple, cost-effective and flexible manner, and of controlling the illumination device to increase the safety of cyclists when they are present in road traffic.

This problem is addressed by the features of the independent claims. Preferred embodiments are the subject matter of the dependent claims.

According to a first aspect of the invention, an illumination device for a vehicle which is operated at least partially by human power, or a trailer thereof, comprises the following:

at least one light guide element; and a mounting device which is suitable for receiving an external light source in such a manner that the light emitted by the light source is at least partially fed into the light guide element, and is able to exit the light guide element in such a manner that the emerging light can serve as illumination for the vehicle which is operated at least partially by human power, and/or for a trailer thereof.

The illumination device serves as an illumination device for a vehicle which is operated at least partially by human power, and/or for a trailer thereof. The vehicle which is operated at least partially by human power particularly includes bicycles of all kinds, electric bikes and/or E-Bikes, and their trailers. Accordingly, the term "bicycle" in the further course of this description can also include the terms electric bike, bicycle with trailer, and electric bicycle with trailer.

The illumination device comprises at least one light guide element. The term light guide element includes optical waveguides and/or fiber optic cables/optical fiber cables.

The number "at least one light guide element" means that the illumination device can comprise one light guide element, or a plurality of light guide elements. A plurality of light guide elements particularly means 9 light guide elements. However, any other number of light guide elements is also possible.

If the illumination device has two or more light guide elements, they are arranged together in such a manner that the mounting device is suitable for feeding and/or coupling the light emitted by the external light source at least partially into all the light guide elements, such that the light of all the light guide elements can emerge from the light guide elements in such a manner that emitted light can be used as illumination for the bicycle. The illumination device also includes a mounting device which is adapted to accommodate an external light source. The light source is preferably accommodated by the mounting device by the light source being surrounded by the mounting device. This can ensure that even when the bicycle moves quickly, the light source in the mounting device holds its position in such a manner that the light emitted by the light source can be at least partially fed into the light guide element and thus can emerge from the light guide element in such a manner that the emerging light can be used as illumination for the bicycle.

One advantage of the illumination device is that its components are very inexpensive to purchase and thus present no incentive for theft. Thus, the illumination device can be left safely on the bicycle.

A further advantage of the illumination device is that the light guide elements themselves emit a part of the light fed into and/or coupled into the same, and/or illuminate and/or glow. As a result, the bicycle is visible from all sides, which increases the safety of the bicycle rider in traffic. This is particularly true for intersections where vehicles approach the cyclist from the side.

The mounting device preferably accommodates a mobile terminal and/or smartphone, such that a light source integrated into the mobile terminal and/or smartphone serves as the external light source.

A light source integrated into the mobile terminal includes all common, as well as future, light sources which are integrated into smartphones. In particular, it includes luminous diodes such as Light Emitting Diodes/LEDs, such as white LEDs, Pulse LEDs and Cree LEDs, by way of example.

Using a mobile terminal and/or smartphone as the external light source has the advantage that every cyclist carries this with him at all times. Mobile terminals and/or smartphones have become a ubiquitous object which every user carries with him at all times, similar to his house keys and his wallet. As a result, every cyclist always has the external light source for his illumination device with him at all times. In addition, the likelihood that a user forgets the smartphone, as the light source, in the illumination device in good weather is minimized. In addition, the ubiquity and the importance of smartphones mean that each user is always taking care to charge the battery and/or accumulator of the smartphone with sufficient electrical energy. As such, a cyclist who uses the above-mentioned illumination device does not go without bicycle illumination, because he always carries the external light source with him, with sufficient electrical energy. Furthermore, the use of a smartphone as an external light source of the above-mentioned illumination device is environmentally friendly because no separate battery needs to be used for the illumination device; rather, the battery already integrated into the mobile terminal can be used.

The mounting device preferably has an opening which corresponds to the light source integrated into the mobile terminal and/or smartphone.

Because the opening in a mounting device corresponds to the light source integrated into the smartphone, the light emanating from the light source integrated into the smartphone can at least partially penetrate the opening of the mounting device and be fed into the at least one light guide element.

A lens or an optical element is preferably attached in the opening of the mounting device. This allows the lens to optically influence the incident light from the external light source in a suitable manner—for example, by bundling, such that the incoming light can penetrate at least partially into the at least one light guide element.

The illumination device preferably comprises a sleeve which must be fastened below the opening of the mounting device, and which is adapted for at least partially accommodating the at least one light guide element. The sleeve accommodates the at least one light guide element in such a manner that the light from the external light source is at least partially fed into the at least one light guide element, and can exit the at least one light guide element in such a manner that the emerging light can be used as illumination for the bicycle.

The mounting device is preferably waterproof so that the external light source, such as a light source installed in a mobile terminal, is protected from environmental conditions related to the weather.

Preferably, the at least one light guide element of the illumination device can be routed in a gooseneck or flexible arm, such that the exit direction of the light exiting the light guide element can be adjusted by moving the gooseneck or flexible arm.

The gooseneck or flexible arm is a semi-rigid, flexible connecting element which can be particularly made of a helix-shaped metal tube. Due to its helix-shaped configuration, it is adapted to be bent in almost any direction, and/or remain in almost any position. Thus, the exit direction of the light emerging from the light guide element can be adjusted by moving the gooseneck. Because the gooseneck has a hollow shape, it is suitable for accommodating single or multiple light guide elements.

Preferably, the gooseneck can be attached to the sleeve which will be attached below the opening of the mounting device of the illumination device. This allows the at least one light guide element to be accommodated by the sleeve in such a manner that light produced by the external light source is at least partially fed into the light guide element. At the same time, the exit direction of the light emerging from the light guide element can be adjusted by moving the gooseneck.

Preferably, the illumination device further comprises: at least one beamforming element which can be attached to the light guide element such that the beamforming element can modify the shape and/or direction of the light emerging from the light guide element, and/or focus the same.

The term "beamforming element" can include any type of reflectors and lenses in this case. By way of example, this can be an LED reflector that focuses the light emerging from the light guide element by means of built-in lenses, so that this light can be used as a front light and/or frontal illumination for the bicycle. In addition, the term "beamforming element" can include colored reflectors and lenses, such that the light emerging from the light guide element can be focused and emitted in any desired color. For example, a red reflector can be accommodated on a light guide element in such a manner that it focuses the light emerging from at least one light guide element and radiates the same in red, such that it can be used as a red rear- and/or warning- and/or brake light for the bicycle.

Furthermore, the term "beamforming element" can include reflectors which refract the light emerging from the at least one light guide element. The emerging light can be emitted indirectly by means of such reflectors. The indirectly emitted light has the advantage that it can have an additional illumination/luminous and/or warning function in road traffic.

In addition, the term "beamforming element" can include any type of luminous figures, which are adapted, due to an at least partially translucent form, for receiving the light emerging from the at least one light guide element, and emitting the same according to their color and shape. This emitted light has the advantage that it serves an additional luminous- and warning function. Furthermore, it has the advantage that a user of the illumination device can customize the same.

However, the term "beamforming element" is not limited to the aforementioned designs. Rather, the term includes any element that is able to modify the shape and/or direction of the light emerging from the at least one light guide element in some way, and/or focus and/or emit the same in an appropriately focused manner.

The number of light guide elements can be matched to a number of beamforming elements. For example, a cyclist can specify that he wishes to attach a headlight, a taillight, and a given, luminous figure as an illumination device on his bicycle, wherein a given, luminous figure includes, for example, a reflector which can be illuminated, as well as a cartoon character which can be illuminated. Thus, the number of light guide elements can be limited to 3. However, it is also possible that the number of light guide elements is significantly higher than the number of beamforming elements used. In such a case, one or more of the beamforming elements can be attached to a bundle of light guide elements such that it receives the light emerging from the bundle of light guide elements.

Preferably, the mounting device of the illumination device is waterproof. This has the advantage that the external light source of the mounting device, when closed, is protected from weather.

Preferably, the mounting device is intended to be fixed to a steering device of the partially human-powered vehicle. The advantage of this is that the cyclist can easily attach an external light source to the mounting device, and can easily switch the illumination device on and off as necessary, even during movement, via the external light source, and/or can control the illumination device according to the method or the embodiments thereof named below for controlling the illumination device.

According to a second aspect of the present invention, the problem on which the invention is based is addressed by a method for controlling an illumination device according to one of the claims 2-6, wherein the method comprises the following functions:

detecting acceleration data using an acceleration sensor integrated into a mobile terminal and/or smartphone, wherein the mobile terminal and/or smartphone is accommodated by a mounting device of the illumination device;

controlling and/or regulating the illumination device according to the acceleration data.

Preferably, the controlling and/or regulating of the illumination device also includes the following functions:
if a representative value for the acceleration exceeds a specific threshold value:
   activating a light source integrated into the mobile terminal and/or smartphone; and/or
   activating a blinking or stroboscopic frequency of the light source.

The term "specific threshold" includes a predetermined and/or prespecifiable threshold.

A value which is representative for the acceleration includes the international unit or SI unit for acceleration: $\vec{a}=m/s^2$. However, it can include any other representative value for acceleration, for example according to the CGS (Centimetre Gram Second), according to the Planck unit system, or according to the Anglo-American system of measurement.

Preferably, the method for controlling an illumination device also has the following functions:
detecting GPS (Global Positioning System) position data which is representative for the position, by means of a GPS sensor integrated into the terminal or smartphone;
if the detected position data corresponds to a special, hazardous GPS position:
   activating a blinking or stroboscopic light source.

A special, hazardous GPS position in this case includes a GPS position which is predetermined or prespecifiable as dangerous.

Preferably, the method for controlling an illumination device also has the following functions:
detecting brightness data using a light sensor and/or photocell integrated into the mobile terminal or smartphone;
if a representative value for the brightness drops below a specific threshold value:
   activating the light source;
   wherein preferably an emittance intensity of the activated light source is regulated automatically according to newly detected brightness data.

A specific threshold value in this case comprises a predetermined or prespecifiable threshold value.

According to a third aspect of the present invention, the problem on which the invention is based is addressed by an application for controlling an illumination device according to the first aspect and/or a preferred embodiment thereof, wherein the application is designed to make a mobile terminal and/or smartphone implement a method for controlling an illumination device according to the second aspect and/or a preferred embodiment thereof.

The described method has the advantage that the smartphone which provides the external light source can also be used to control the illumination device in a way that goes far beyond manually switching the light source on and off. In particular, the illumination device can also be controlled, in addition to a conventional illumination device, in such a manner that the illumination device can be controlled according to a detected acceleration and a detected negative acceleration in such a manner that by activating the light source integrated into the smartphone, and/or by activating a stroboscopic effect of the light source integrated into the smartphone, an additional warning function is activated. This increases the security of the cyclist who uses the illumination device in road traffic.

These and other objects, features and advantages of the present invention will become apparent from a reading of the following detailed description of preferred embodiments and the accompanying drawings. It can be seen that even though embodiments are separately described, single features thereof may be combined to additional embodiments.

BRIEF DESCRIPTION OF THE DRAWINGS

FIG. 1 shows a mounting device of an illumination device;

FIG. 2 shows an illumination device having a mounting device, two light guide elements, and two beamforming elements;

FIG. 5 shows two light guide elements, two beamforming elements, and a sleeve;

FIG. 11 shows a plurality of light guide elements which are accommodated by a sleeve, together with the mounting device;

FIG. 12 shows the illumination device in FIG. 2 attached to a bicycle;

FIG. 14 shows the illumination device in FIG. 13A attached to the bicycle trailer.

DETAILED DESCRIPTION

Figure 3A:
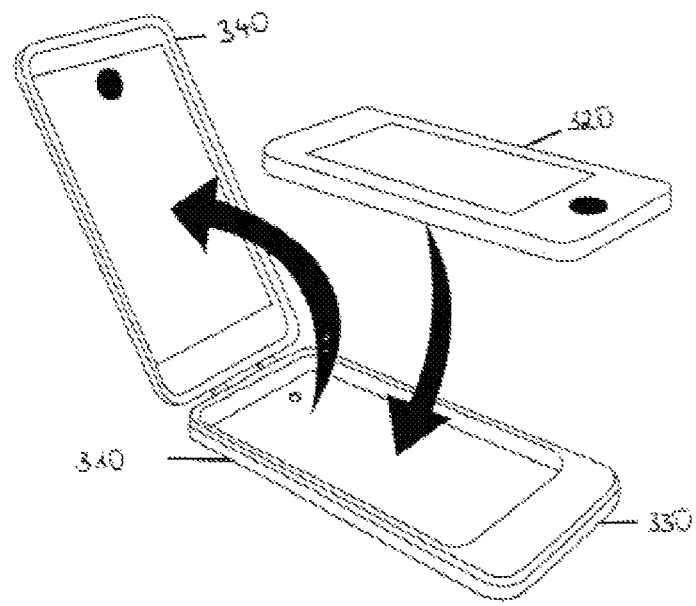
FIG. 3A shows a mobile terminal and/or smartphone to be accommodated by the mounting device of the illumination device.

FIG. 1 shows a mounting device 100 which is adapted to accommodate an external light source 110. In FIG. 1, a light source integrated in a smartphone is to be received as an external light source 110. However, the mounting device 100 can also receive any other external light source.

The mounting device 100 preferably comprises an opening 120 which corresponds to the light source integrated into the smartphone. This allows the light emerging from the light source integrated into the smartphone to be at least partially fed and/or coupled into the opening of the mounting device 100.

A lens and/or an optical element is preferably attached at the opening 120 of the mounting device 100 (not shown in FIG. 1). This allows the lens and/or the optical element to optically influence the incident light from the external light source 110 in a suitable manner—for example, by focusing—such that the light can penetrate at least partially into the at least one light guide element.

FIG. 2 shows an illumination device 200 which includes the mounting device 210 of FIG. 1. The illumination device 200 includes in this example two light guide elements 220 which are mounted in such a manner that the light emerging from the light source 240 is at least partially fed and/or coupled into the light guide elements 220. The illuminating device 200 further includes two beamforming elements 230, each attached to one of the light guide elements 220.

Preferably, the illumination device 200 comprises a sleeve (not shown in FIG. 2) which is to be attached below the opening 250 of the mounting device 210 (not shown in FIG. 1), and which is adapted to accommodate at least one light guide element 220 at least partially.

In the exemplary illumination device 200 of FIG. 2, the illumination device 200 has two light guide elements 220 which are accommodated by the sleeve in such a manner that the incident light from the external light source 240 is at least partially fed into the two light guide elements 220, and can emerge from the two or more light guide elements 220 via the beamforming elements 230 in such a manner that the emerging light can be used as illumination for the bicycle.

If the illumination device 200 has more than two light guide elements 220, the emerging light can be fed into the more than two light guide elements 220, as described further below with reference to FIG. 7. This arrangement has the advantage that a plurality of light guide elements can be bundled such that the intensity of the emerging light is increased. The bundle of light guide elements on the bicycle or a trailer thereof can be routed to a location at which the light is currently needed and/or desired.

Preferably, the mounting device 210 is waterproof, such that the external light source is protected from the weather.

Below, the term "light guide element" can be substituted by the term "bundle of any number of light guide elements."

FIG. 3A shows a smartphone 320 which is to be accommodated in the mounting device 310 of FIG. 1. The mounting device 310 in FIG. 3A is open. The smartphone 320 is at least partially accommodated in a lower housing part 330 of the mounting device 310. After the smartphone 320 has been accommodated by the lower housing part 330, the upper housing part 340 can be closed (not shown in FIG. 3A).

Figure 3B:
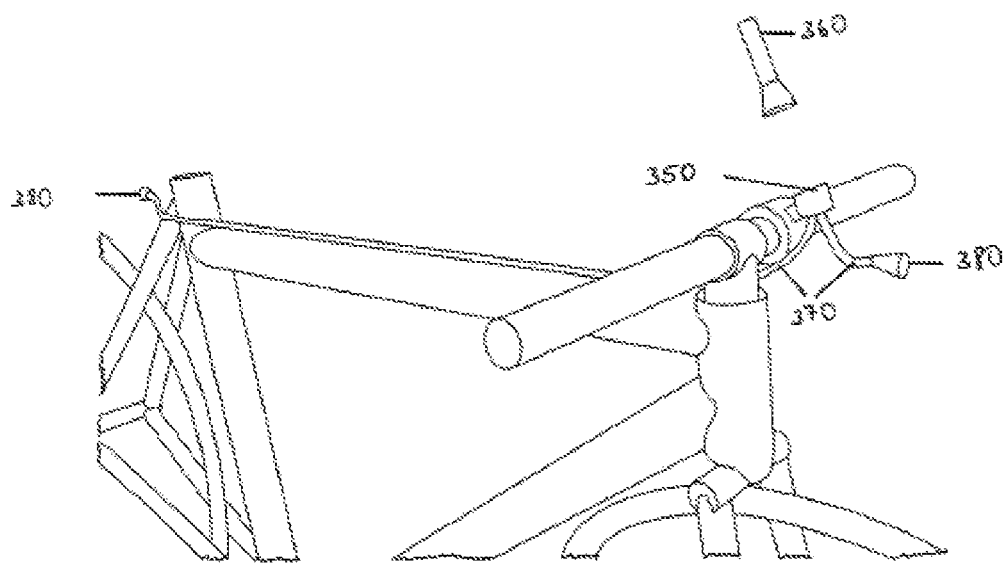
FIG. 3B shows a flashlight to be accommodated by the mounting device of the illumination device.

FIG. 3B shows an illumination device which includes an alternative mounting device 350. The alternative mounting device is adapted to accommodate a flashlight 360 and/or another suitable light source as the external light source. The flashlight 360 is to be accommodated at least partially in a housing of the mounting device 350.

The alternative illumination device in this example includes two light guide elements 370 which are attached in such a manner that the light emitted by the flashlight 360 can be at least partially fed and/or coupled into the light guide element 370. The illuminating device further includes two beamforming elements 380, each attached to one of the light guide elements 370.

Preferably, the illumination device comprises a sleeve (not shown in FIG. 3B), to be fixed under an opening of the mounting device 350 (not shown in FIG. 3B), said sleeve being adapted to receive at least one light guide element 370 at least partially.

In the exemplary illumination device of FIG. 3B, the illumination device has two light guide elements 370 which can be accommodated by the sleeve in such a manner that the light coming from the flashlight 360 can be at least partially fed and/or coupled into the two light guide elements 370, and can emerge from the two or more light guide elements 370 via the beamforming elements 380 in such a manner that the emitted light can be used as illumination for the bicycle.

Alternatively, the light guide elements 370 can also be secured to the mounting device 350 (not shown in FIG. 3B), by means of magnets as described with reference to FIG. 6B.

The illumination device can also comprise more than two light guide elements 370. In this case, the emitted light is fed into more than two light guide elements, as described further below with reference to FIG. 7. This arrangement has the advantage that a plurality of light guide elements can be bundled such that the intensity of the emerging light is increased. The bundle of light guide elements on the bicycle or a trailer thereof can be routed to a location at which the light is currently needed and/or desired.

In a further example, the illumination device comprises a sleeve (not shown in FIG. 3B) which is to be attached below the opening of the mounting device and is adapted to at least partially accommodate any number of light guide elements, as described below with reference to FIGS. 5, 6A, 7, and 8. The light guide elements are accommodated by the sleeve in such a manner that the incident light from the flashlight can be at least partially fed and/or coupled into the accommodated light guide elements, and can exit the accommodated light guide elements in such a manner that the emerging light serves as illumination for the bicycle or a trailer thereof.

The light guide elements 370 can each be routed to a front end and a rear end of the bicycle. Thus, using a first beamforming element 380, such as a lens or a white LED reflector, the light emerging from the light guide element 370 at the front end of the bicycle is focused in such a manner that it can be used as a front light for the bicycle. Using a second beamforming element 380, such as a red lens or a red LED reflector, for example, light emerging from the light guide element 370 at the rear end can be focused in such a manner that it can be used as the rear light for the bicycle.

Figure 4A:
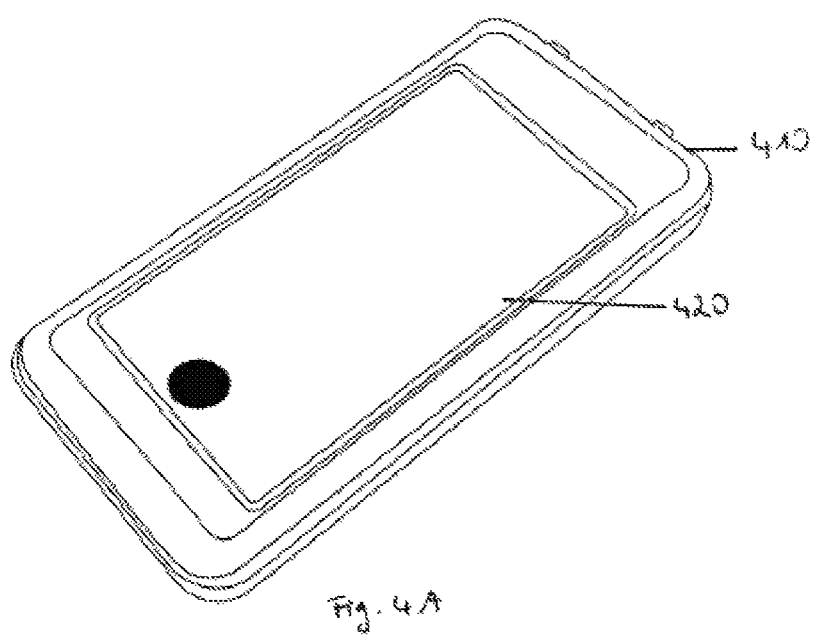
FIG. 4A shows a mobile terminal and/or smartphone to be accommodated by the mounting device in FIG. 3A.

FIG. 4A shows the closed mounting device 410 of FIG. 3A, in which the smartphone 420 has been successfully accommodated.

Figure 4B:
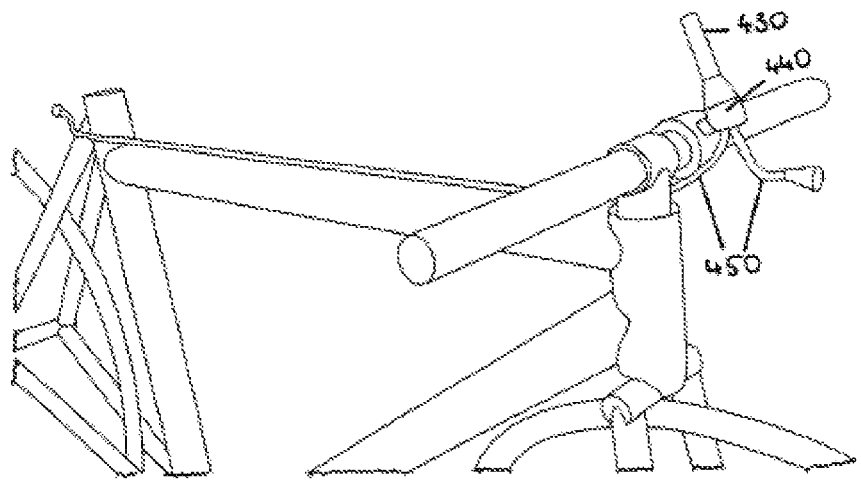
FIG. 4B shows a flashlight which is accommodated by the mounting device in FIG. 3B.

FIG. 4B shows the mounting device 440 of FIG. 3B, in which the flashlight 430 has been successfully accommodated.

FIG. 5 shows the illumination device 500 of FIG. 2 without the mounting device as described in FIGS. 2 to 4. The illumination device 500 shows, by way of example, two light guide elements 510, wherein one beamforming element 520 is attached to each of the same. In addition, FIG. 5 shows the sleeve 530 which is to be secured below the mounting device. Both light guide elements 510 are accommodated by the sleeve.

The exemplary illumination device 500 of FIG. 5 has two light guide elements 510 which have been accommodated by the sleeve 530 in such a manner that—after the sleeve 530 has been secured to the mounting device beneath the opening—the light produced by the external light source is fed at least partially into the two light guide elements 510, and can exit the two or more light guide elements 510 via the beamforming elements 520, in such a manner that the emerging light can be used as illumination for the bicycle. By way of example, the light emerging via the two light guide elements 510 can exit each of the beamforming elements 520 in such a manner that it can be used, respectively, as a headlight and a taillight for the bicycle.

However, the present example is not limited to the accommodation of two light guide elements. Rather, any number of light guide elements 510 can be accommodated by the sleeve 530.

Figure 6A:
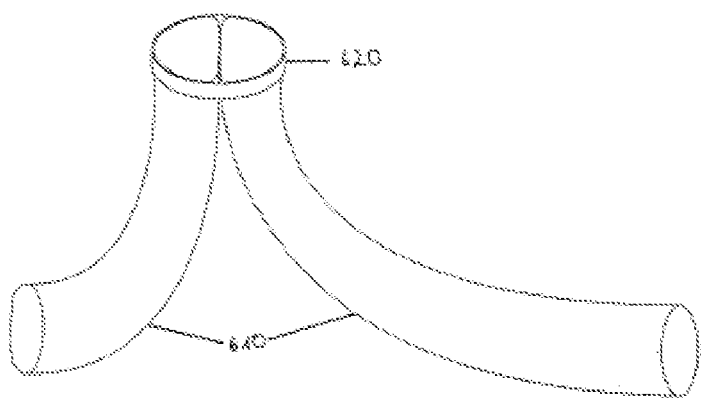
FIG. 6A shows two light guide elements which are accommodated by a sleeve.

FIG. 6A shows an example of the accommodation of two light guide elements 610 by a sleeve 620, as described in FIG. 5. Here as well, the present example is not limited to the accommodation of two light guide elements 610. Rather, any number of light guide elements can be accommodated by the sleeve, as shown by way of example in FIG. 7.

Figure 6B:
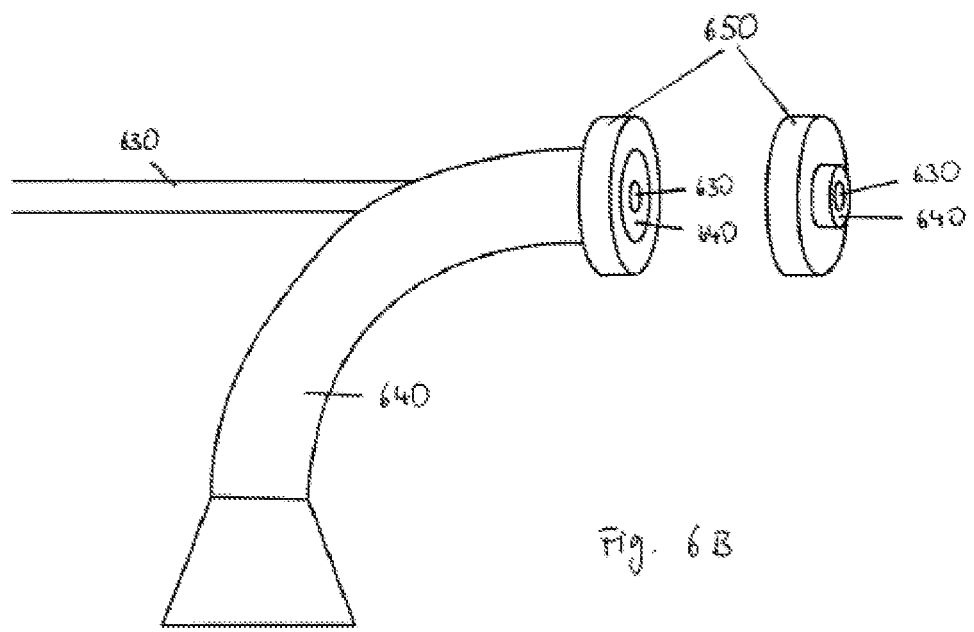
FIG. 6B shows two light guide elements which are accommodated by a magnet.

FIG. 6B shows a further example of an illumination device. This example shows a part of the illumination device as described with reference to FIGS. 9A, 9B and 10. In particular, the drawing shows an example of the accommodation of two light guide elements 630, 640 by a first magnet and/or neodymium magnet and/or neodymium-iron-boron magnet 650. Further, the drawing shows the accommodation of two further light guide elements 630, 640 by a second magnet and/or neodymium magnet and/or neodymium-iron-boron magnet 650. The length of the two further light guide elements can correspond in this example to a height of the second magnet 650. A diameter of the two further light guide elements can correspond to the diameter of the light guide elements accommodated by the first magnet 650.

Alternatively, the second magnet 650 can include solely a recess, the diameter of which corresponds to the diameter of the light guide elements accommodated by the first magnet 650. In this case, the second magnet 650 is attached to the mounting device in such a manner that the light emitted by the external light source can at least partially pass through the recess of the second magnet 650. The second magnet 650 can be connected to the first magnet 650 in such a manner that the light emitted by the external light source can at least partially pass through the recess of the second magnet 650 and be fed and/or coupled into the two light guide elements 630, 640. Thus, the light emerging from the light guide elements can serve as illumination for the bicycle.

For example, the second magnet 650 can be attached to the mounting device in such a manner that the light emitted by an external light source and passing through an opening of the mounting device is at least partially fed and/or coupled into the two further light guide elements 630, 640. By way of example, the second magnet 650 can be attached to the first magnet 650 in such a manner that the light fed and/or coupled into the two further light guide elements 630, 640 can emerge from the same in such a manner that it is at least partially fed and/or coupled into the two light guide elements 630, 640 which are accommodated by the first magnet 650. In particular, the light can be coupled-in in such a manner that it can emerge from the two light guide elements 630, 640 such that the emerging light can be used as illumination for the bicycle.

This example shows a simple fastening option for the light guide elements 630, 640 on the mounting device. This fastening option has the advantage that the mounting device can be removed from the bicycle after the ride and/or attached anywhere on the bicycle before the ride begins. In addition, this example has the advantage that the exit direction of the light exiting from the light guide elements can be modified by turning and/or rotating the first magnet. A further advantage of this example is that the light guide elements, with the associated beamforming elements, can be attached to a variety of mounting devices, each adapted to accommodate different external light sources.

Figure 7:
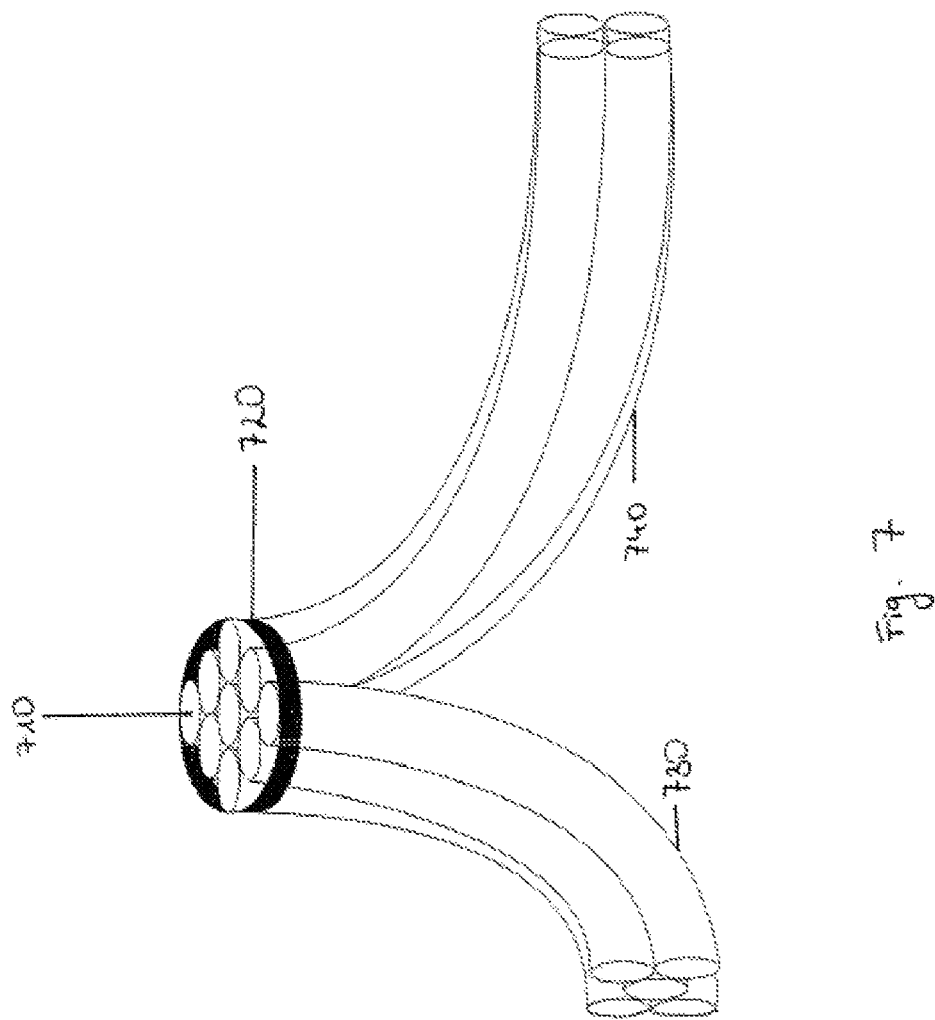
FIG. 7 shows nine light guide elements which are accommodated by a sleeve.

FIG. 7 shows, as a further example, nine light guide elements 710 which are accommodated by a sleeve 720. In this example, two bundles 730, 740 of light guide elements 710 are formed from the nine light guide elements 710. The first bundle 730 of light guide elements 710 consists of five single light guide elements 710, and the second bundle 740 of light guide elements 710 consists of four single light guide elements 710.

Alternatively, the nine light guide elements 710 can be accommodated by a magnet (not shown in FIG. 7), as described with reference to FIG. 6B.

According to the present example, the two bundles 730, 740 of light guide elements 710 can be formed from any number of light guide elements. In addition, any given number of bundles of light guide elements can be formed, as will be illustrated with reference to FIG. 8 below, by way of example. Each bundle of light guide elements can be routed to a position on the bicycle or a trailer thereof at which the light exiting the light guide elements is needed or desired.

Figure 8:
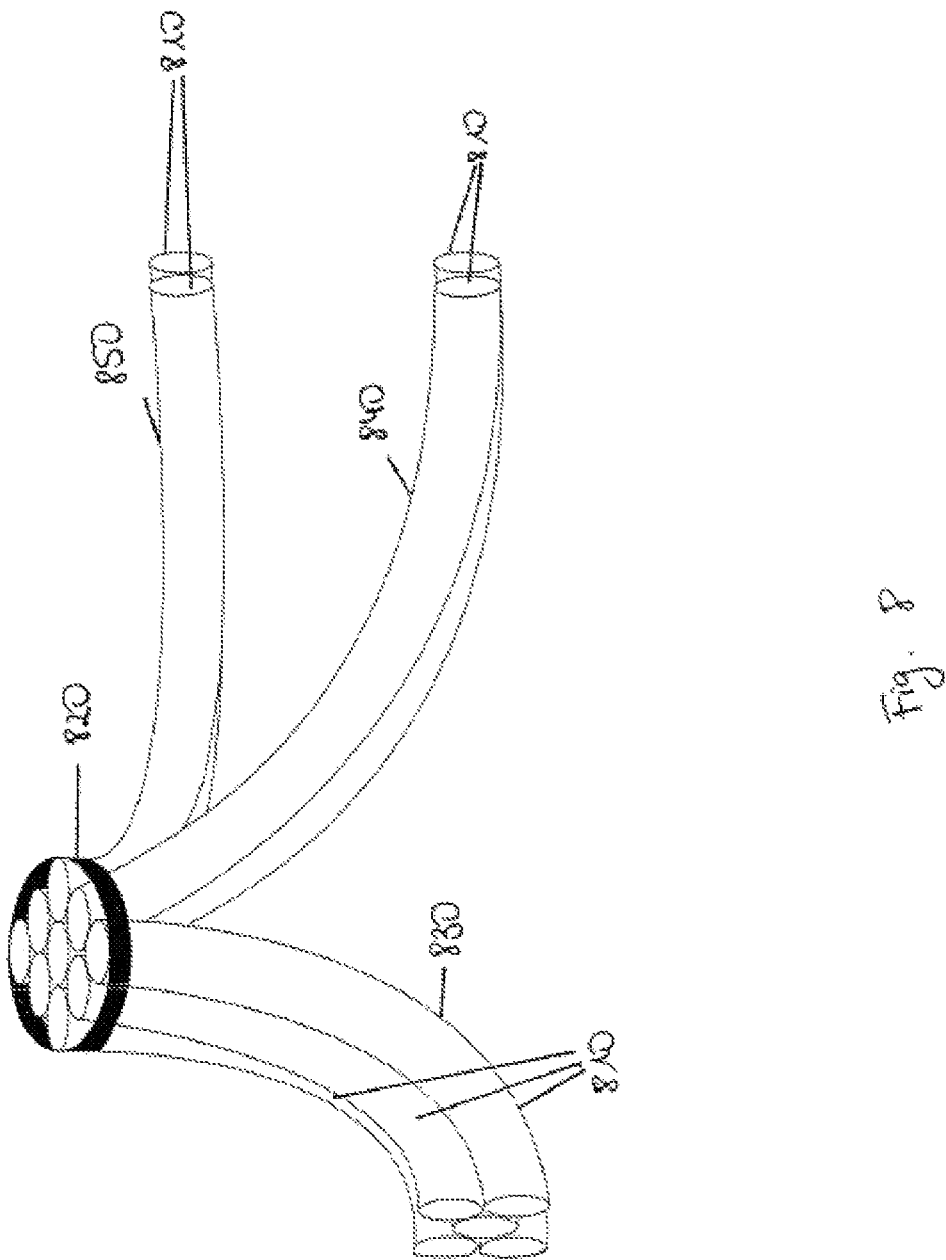
FIG. 8 shows nine light guide elements which are accommodated by a sleeve and are combined into three bundles of light guide elements.

FIG. 8 shows a further example of nine light guide elements 810 which are accommodated by a sleeve 820. In this example, three bundles 830, 840, 850 of light guide elements 810 are formed from the nine light guide elements 810. The first bundle 830 of light guide elements 810 consists of five individual light guide elements 810, while the second and the third bundle 840, 850 of light guide elements 810 consist of two light guide elements each 810.

Alternatively, the nine light guide elements 810 can be accommodated by a magnet (not shown in FIG. 8), as described with reference to FIG. 6B.

Figure 9B:
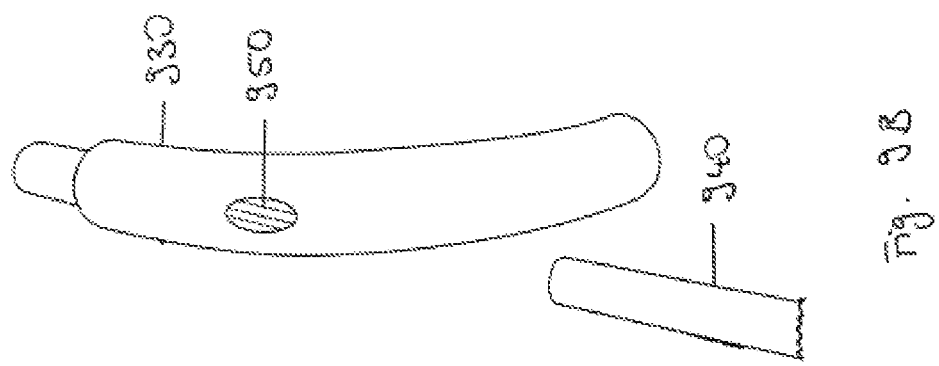
FIG. 9B shows a first light guide element, in which a second light guide element can be accommodated via an opening.
Figure 9A:
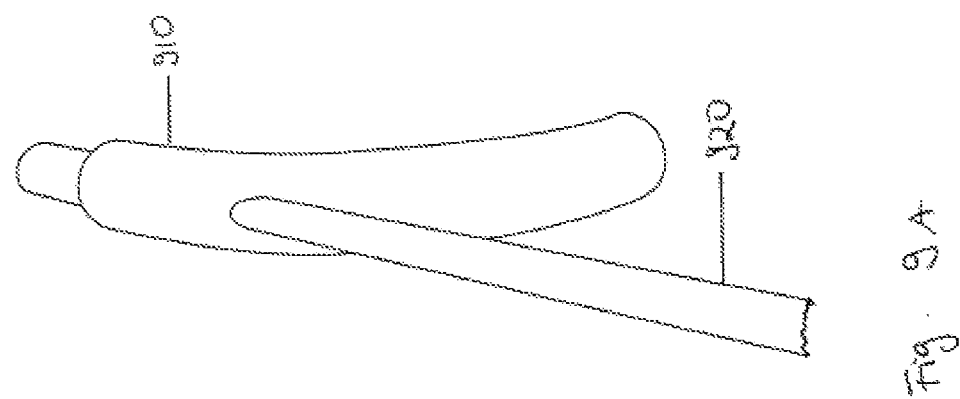
FIG. 9A shows a first light guide element in which a second light guide element is attached.

FIG. 9A shows a further example for a part of an illumination device according to FIG. 2. More particularly, it shows a first light guide element 910 to which a second light guide element 920 is attached. The first light guide element 910 is, for example, a curved, rigid light guide element made of acrylic glass and/or polymethylmethacrylate/PMMA. A second flexible light guide element 920 can be attached to the curved, rigid light guide element 910.

One end of the curved, rigid light guide element 910 can be attached in such a manner below and/or at an opening of the mounting device (not shown in FIG. 9A) that the light passing at least partially into the opening of the mounting device can be at least partially fed and/or coupled into the curved, rigid light guide element 910. The light which is fed and/or coupled into the curved, rigid light guide element 910 can be at least partially fed and/or coupled into the second, flexible light guide element 920, and can emerge from the two light guide elements 910, 920 in such a manner that the emitted light can be used as illumination for the vehicle which is operated at least partially by human power, or a trailer thereof.

On a second end of the curved, rigid light guide element 910, a beamforming element—for example a lens or a white LED reflector—can be attached in such a manner that the beamforming element can modify and/or focus the shape and/or direction of the light emerging from the light guide element, such that it can serve as a front light for the bicycle.

The second light guide element 920 can be routed to a rear end of the bicycle. For example, it can be routed by being affixed using cable fastener elements. The term "cable fastener element" includes cable ties, cable clamps, pressure clamps, and any type of cable guide elements. A second beamforming element—for example, a red lens or a red LED reflector—can be attached to the second light guide element 920 in such a manner that it can modify or focus light emerging from the second light guide element such that it can serve as a rear light for the bicycle.

Alternatively, a red fluorescent acrylic glass or polymethylmethacrylate/PMMA rod, and/or a red fluorescent Plexistab, can be attached to the second light guide element 920 in such a manner that the light emerging from the second light guide element 920 is fed at least partially into the fluorescent Plexistab. A beamforming element—for example a lens or an LED reflector—can be attached to the same, such that the red light emerging from the fluorescent Plexistab can be modified or focused in such a manner that it can be used as the rear light for the bicycle.

The second light guide element can alternatively be routed to one end of the bicycle by being wrapped around the bicycle frame. This has the advantage that the second light guide element only needs to be fixed at a single location of the bicycle with a fastening element. This fastening variant has the advantage that it is particularly inexpensive.

The present example is not limited to the use of two light guide elements. Rather, any number of light guide elements can be formed and/or collected into a bundle of light guide elements. The bundle of light guide elements in this example can replace the second optical fiber, and can be routed to the location on the bicycle and/or a trailer thereof where the light emerging from the bundle of light guide elements is needed and/or desired as illumination for the bicycle.

A substantial advantage of this example is that the curved light guide element 910 can be attached to the mounting device by a plug connection, for example. Alternatively, the curved light guide 910 can be attached to the mounting device using magnets, as described with reference to FIG. 6B.

These examples have the advantage that the light guide elements 910, 920 can be removed after a bicycle ride, together with the beamforming elements, from the mounting device, and taken with the rider.

A further advantage of these examples is that no sleeve and no gooseneck are needed to attach the light guide elements 910, 920 to the mounting device. As a result, the cost of the illumination device is minimized in this example.

FIG. 9B illustrates again the part of the illumination device as described with reference to FIG. 9A. On this part of the illumination device, the second light guide element 940 can be accommodated via a recess 950 of the curved, rigid light guide element 930 in such a manner that the light which is fed and/or coupled at least partially into the curved light guide element 930 can be received at least partially in the second light guide element 940. The second light guide element 940 can be accommodated by, and/or removed from, the rigid light guide element 930 via the recess 950, by a plug connection. This has the advantage that the illumination device can be flexibly used either only as a front light or as a front and rear light for the bicycle.

Preferably, the second beamforming element can be fastened to the bicycle by means of an angular fastening element. The fastening to the bicycle can be performed by means of an anti-theft screw or a coding bolt, by means of which the illumination device can be attached in a theft-proof manner. The term "coding bolt" includes a bolt which can only be installed and/or uninstalled using a specific wrench and/or screwdriver with a shape which is matched to the bolt used.

Preferably, all exemplary illumination devices can be installed using coding bolts.

Figure 10:
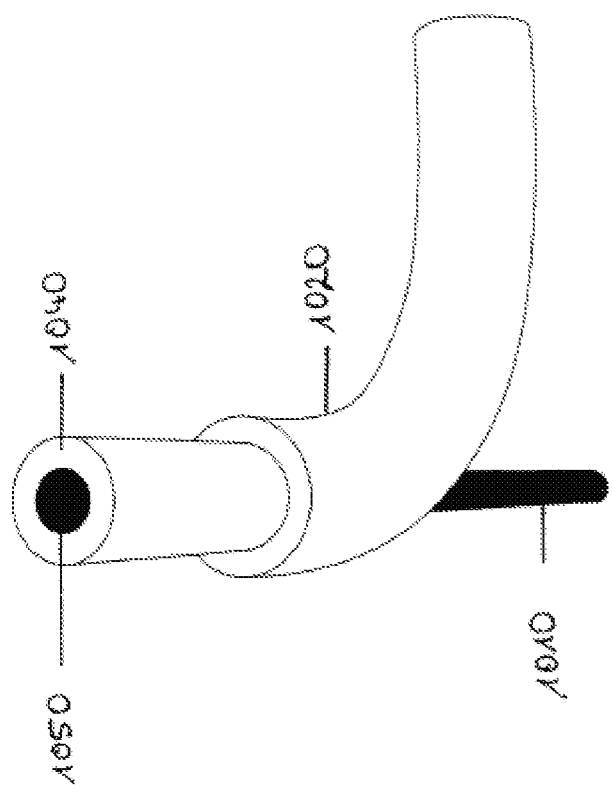
FIG. 10 shows an end of the first and the second light guide elements in FIGS. 9A and 9B.

FIG. 10 illustrates the part of the illumination device as explained with reference to FIGS. 9A and 9B. In particular, one end of the rigid light guide element 1020 in this case can be attached to the mounting device of the bicycle in such a manner that the light emitted by the external light source can be at least partially fed or coupled into the rigid light guide element 1020, and thus also at least partially coupled into the second light guide element 1010.

For example, the two light guide elements 1020, 1010 can be attached to the mounting device by means of two magnets as described above with reference to FIG. 6B.

The rigid light guide element 1020 can be attached to the mounting device in such a manner that its position can be changed by turning or rotating. This has the advantage that the exit direction of the light emerging from the rigid guide element 1020 and modified and/or focused via the beamforming element light can be modified by turning and/or rotation of the rigid light guide element.

The second light guide element 1010 can be routed on the bicycle or a trailer thereof to a location (not shown in FIG. 10) where the light emerging from the light guide element is needed and/or desired as a further light source (not shown in FIG. 10). Thus, the second light guide element 1010 can be routed, for example, to a rear end of the bicycle. In addition, a second beamforming element, for example a red lens or a red LED reflector, can be attached to the second light guide element 1010 in such a manner that the shape and/or direction of the light emerging from the second light guide element 1010 can be focused in such a manner that it can be used as a rear light for the bicycle or a trailer thereof.

Alternatively, a red fluorescent acrylic glass or polymethylmethacrylate/PMMA rod, or a red fluorescent Plexistab, can be attached to the second light guide element 1010 in such a manner that the light emerging from the second light guide element is at least partially fed into the fluorescent Plexistab. A beamforming element, for example a lens or an LED reflector, can then be attached to the Plexistab in such a manner that the red light emerging from the fluorescent Plexistab can be modified and/or focused in such a manner that it can be used for the bicycle rear light.

FIG. 11 shows a mounting device as shown in FIG. 4A, by means of which is accommodated a mobile terminal and/or smartphone in such a manner that an opening of the mounting device corresponds to a light source integrated into the mobile terminal and/or smartphone. As such, the light which is emitted by the light source can shine at least partially through the opening of the mounting device.

Preferably, a lens and/or a suitable optical element is attached at the opening of the mounting device (not shown in FIG. 11) such that the light emitted by the light source can be suitably optically influenced—for example, can be focused.

Preferably, the illumination device 1120 comprises a sleeve 1130 which is to be attached below the opening of the mounting device and is adapted to at least partially accommodate any number of light guide elements 1110, as described with reference to FIGS. 5 to 8. The light guide elements 1110 are accommodated by the sleeve 1130 in such a manner that the light produced by the external light source is at least partially fed into the two or more accommodated light guide elements 1110, and can emerge from the two or more light guide elements 1110 in such a manner that the emitted light can serve as illumination for a bicycle and/or the trailer thereof, as described below with reference to FIGS. 12 to 14.

Alternatively, a curved, rigid light guide element as described with reference to FIGS. 9A, 9B and 10 is attached to the illumination device in such a manner that the light emerging from the external light source is at least partially fed and/or coupled into the rigid light guide element, as well as a second light guide element, and can emerge from the light guide elements in such a manner that the emitted light can be used as illumination for a bicycle or a trailer thereof as described with reference to FIGS. 12 to 14. For example, the curved, rigid light guide element can be attached to the mounting device by means of a magnet, as described with reference to FIG. 6B.

FIG. 12 shows a bicycle to which an illumination device 1210 is attached. As shown in FIG. 12, a mounting device, as described in FIGS. 1 to 4, and 11, is attached to a steering device of the bicycle. In this example, two light guide elements 1220 are attached by means of a sleeve (not shown in FIG. 12) below an opening (not shown in FIG. 12) of the mounting device, in such a manner that a light emitted by a light source integrated into a smartphone accommodated by the mounting device is at least partially fed and/or coupled into the two light guide elements 1220. One beamforming element 1230, 1240 is attached to each of the two light guide elements 1220.

The first beamforming element 1230 is, by way of example, a lens or a white LED reflector which can modify or focus the shape and/or direction of the light exiting from the first light guide element 1220 in such a manner that it is suitable as a front light for the bicycle. Optionally, the first light guide element 1220 is routed in a gooseneck 1250. As such, the exit direction of the light exiting from the first light guide element 1220 can be modified by moving the gooseneck 1250.

Alternatively, the first and second light guide elements 1220 can be attached by means of magnets, as described with reference to FIG. 6B, to the mounting device in such a manner that the light emitted from the smartphone is at least partially fed and/or coupled into the two light guide elements 1220. The light guide elements 1220 can be light guide elements as described with reference to FIGS. 9A, 9B and 10. In this case, the exit direction of the front light on the bicycle can be modified by moving and/or rotating the magnet.

The second beamforming element 1240 is, for example, a red lens or a red LED reflector which is attached to one end of the second light guide element 1220. The second light guide element 1220 is routed to a rear end of the bicycle. The red LED reflector focuses the shape and/or direction of the light exiting the second light guide element 1220 in such a manner that it is suitable as a rear light for the bicycle. Optionally, a part of the second light guide element 1220 can be accommodated, on the end at which the beamforming element 1240 is attached, by a second gooseneck (not shown in FIG. 12) in such a manner that the exit direction of the light emerging from the second light guide element 1220 can be modified by moving the second gooseneck.

Alternatively, a red fluorescent acrylic glass or polymethylmethacrylate/PMMA rod, or a red fluorescent Plexistab, can be attached to the second light guide element 1220 in such a manner that the light emerging from the second light guide element 1220 is at least partially fed into the fluorescent Plexistab. To this can be attached a beamforming element 1240, such as a lens or an LED reflector, such that the red light emerging from the fluorescent Plexistab can be modified and/or focused such that it can be used for the bicycle rear light.

Figure 13A:
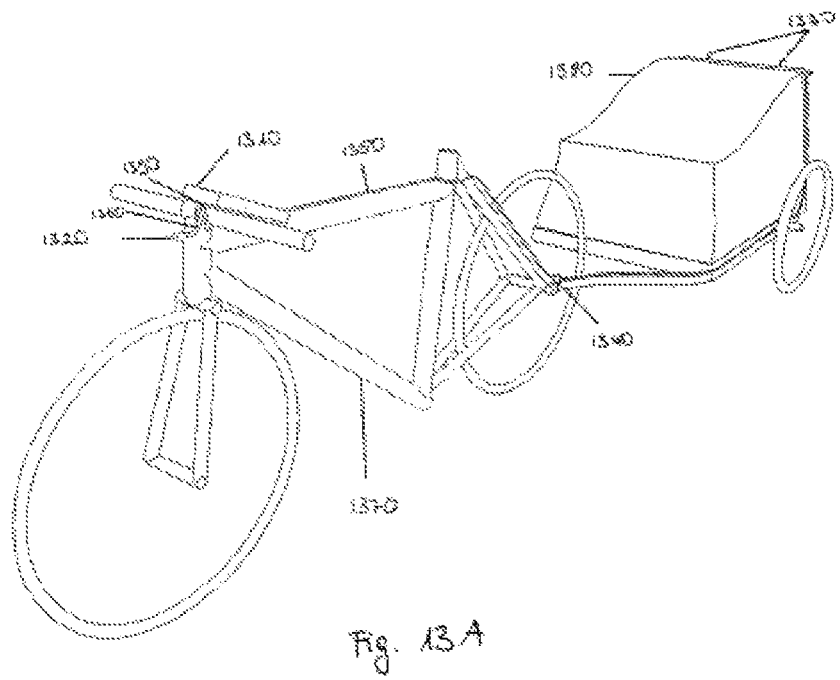
FIG. 13A shows an illumination device attached to a bicycle with a bicycle trailer.

FIG. 13A shows the illumination device 1310 described above, which is attached to a bicycle 1370 and its trailer 1380. A mounting device as described in FIGS. 1 to 4 and 11 is attached to a steering device of the bicycle 1370. Two light guide elements 1350 are accommodated by a sleeve 1390 which is attached below an opening (not shown in FIG. 13A) of the mounting device in such a manner that a light emitted by a light source integrated into the smartphone— which is accommodated by the mounting device—is at least partially fed and/or coupled into the two light guide elements 1350.

A first light guide element 1350 is routed in a gooseneck 1360. A beamforming element 1320 is attached to the first light guide element 1350. The first beamforming element 1320 is, by way of example, a white LED reflector which can modify or focus the shape and/or direction of the light exiting from the first light guide element 1350 in such a manner that it is suitable as a front light for the bicycle 1370. In addition, the exit direction of the front light on the bicycle can be modified by moving the gooseneck 1360.

Alternatively, the first and the second light guide elements 1350 can be attached to the mounting device by means of magnets, as described above with reference to FIG. 6B, in such a manner that the light emitted by the smartphone is at least partially fed and/or coupled into the two light guide elements 1350. The light guide elements 1350 can be light guide elements as described with reference to FIGS. 9A, 9B and 10. In this case, the exit direction of the front light on the bicycle can be modified by moving and/or rotating a magnet.

Two beamforming elements 1330 are attached on a second light guide element 1350. The second light guide element is optionally two separate light guide elements 1350, on each of which a beamforming element 1330 is attached.

The two beamforming elements 1330 are, by way of example, two red lenses and/or two red LED reflectors. The second light guide element 1350 is routed to a rear end of the bicycle trailer 1380 such that the shape and/or direction of the light emerging from the second light guide element 1350 is modified and/or focused by the two beamforming elements 1330 in such a manner that the light can be used as a rear light for the bicycle with a trailer.

The second light guide element 1350 is optionally accommodated, on the end of the second light guide element 1350 on which the two beamforming elements 1330 are attached, by a second and/or third gooseneck (not shown in FIG. 13A), such that the exit direction of the light emitted from the two beamforming elements 1330 can be modified by moving the second and/or third gooseneck(s).

Alternatively, two red, fluorescent acrylic glass or polymethylmethacrylate/PMMA rods, or two red fluorescent Plexistabs, can be attached to the second light guide element 1350 in such a manner that the light emerging from the second light guide element 1350 is at least partially fed and/or coupled into the fluorescent Plexistabs. On each of these, a beamforming element 1330, such as a lens or an LED reflector, can be attached such that the red light emerging from the fluorescent Plexistabs can be modified or focused in such a manner that it can be used for the bicycle rear light and/or brake light.

Optionally, the second light guide element 1350 is extended by means of an appropriate plug connector 1340, such as a coupling for optical fibers, for example. This example has the advantage that the second light guide element enables a rear illumination for the bicycle trailer 1380 when in its extended form—that is, when it is extended via the coupling—whereas in its short form (that is, when the extension via the coupling is removed) it can be used as a rear illumination for the bicycle 1370, as described with reference to FIG. 12. In this case, the second light guide element would only need to be routed as described with reference to FIG. 12 and provided with a corresponding beamforming element.

Figure 13B:
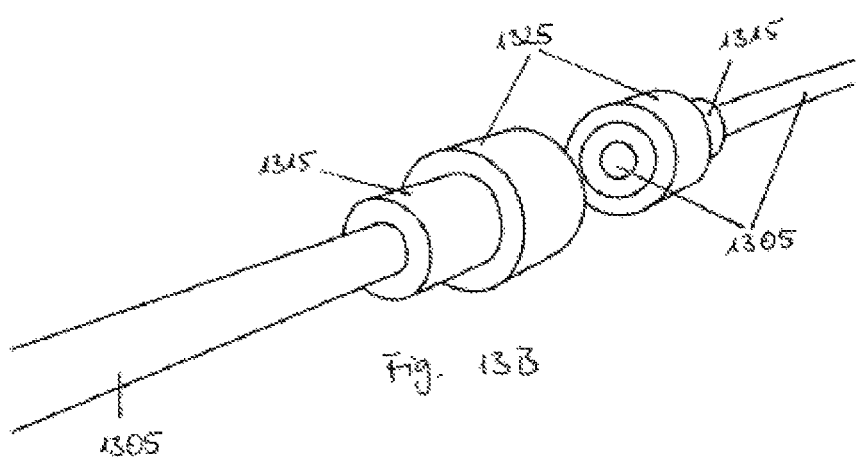
FIG. 13B shows a coupling of two optical waveguides via a magnet.

FIG. 13B shows a further example of a plug connector for light guide elements, in order to extend an existing light guide element 1305. In this example, the ends of the light guide elements 1305 to be connected are each accommodated in a sleeve and/or guide sleeve 1315. Each of the guide sleeves 1315 is additionally accommodated by a magnet and/or neodymium magnets and/or neodymium-iron-boron magnets 1325. For example, the second light guide element 1305, as described with reference to FIG. 13A, can be extended by the two magnets 1325 being joined together.

This example has the advantage that the second light guide element 1305 enables a rear illumination for the bicycle trailer 1380 when in its extended form—that is, when it is extended by means of magnets 1325—whereas in its short form (that is, when the extension via the coupling is removed) it can be used as a rear illumination for the bicycle 1370, as described with reference to FIG. 12. In this case, the second light guide element 1305 would only need to be routed as described with reference to FIG. 12 and provided with a corresponding beamforming element.

FIG. 14 shows a part of the illumination device as described with reference to FIG. 13A, which is attached to the bicycle trailer 1400.

In this example, the second light guide element 1410 is routed in the specific areas in which the two beamforming elements 1430 are attached, in a second and/or a third gooseneck 1420, such that the exit direction of the light emitted from the two beamforming elements 1430 can be modified by moving the second and/or third goosenecks 1420.

If the second light guide element 1410 is two separate light guide elements, then each one of the separate light guide elements is routed in a separate gooseneck 1420.

Alternatively, in each of the areas in which the two beamforming elements 1430 are to be attached, a curved, rigid light guide element made of acrylic glass or polymethylmethacrylate/PMMA can be attached. A second and/or a third beamforming element, for example a red lens or a red LED reflector, can be attached to the rigid light guide elements in such a manner that they can modify and/or focus light emerging from the second light guide element such that it can be used as a rear light and/or brake light for the bicycle.

Alternatively, a red fluorescent acrylic glass or polymethylmethacrylate/PMMA rod, or a red fluorescent Plexistab, can be attached to each of the rigid light guide elements in such a manner that the light emerging from the second light guide element is at least partially fed into the fluorescent Plexistabs. A beamforming element, such as a lens or an LED reflector, can be attached to the same, such that the red light emerging from the fluorescent Plexistab, can be modified and/or focused in such a manner that it can be used as the rear light for the bicycle.

The illumination device described has the advantage that it is completely independent of a shape and/or length of a bicycle or a trailer thereof. The required light guide elements can be flexibly routed to those locations on the bicycle or a trailer thereof where an illumination for the bicycle and/or a trailer thereof is needed and/or desired. In addition, the illumination device only requires one central light source for illumination.

Any given number of light guide elements can be used, such that the light fed and/or produced and/or coupled in from the external light source can exit through individual light guide elements or though bundles of light guide elements at the respective beamforming elements.

Beyond a conventional illumination (headlight and taillight), any given beamforming element can be attached to any given point of the bicycle, or a trailer thereof. As such, the beamforming element can be any photostimulable figure which is capable of receiving the light emitted by a light guide element or a bundle of light guide elements, shaping and/or focusing the same, and at least partially emitting the same in a corresponding shaped and/or focused form.

A further advantage of the illumination device described above is that the light guide elements routed on the bicycle or a trailer thereof are made of materials such as quartz glass, plastic or silicon dioxide. As such, the light guide elements themselves are luminous when the central light source emits light into the same. For this reason, the light guide elements provide a further safety aspect for bicycles in road traffic.

Control of the Illumination Device Described Above

The illumination device described above can also be controlled by means of an application/app which implements a method for controlling the illumination device, via a mobile terminal and/or smartphone which is accommodated by the mounting device.

A user and/or cyclist can, before or after a smartphone or mobile terminal has been accommodated in the mounting device, activate the application by, for example, tapping a corresponding icon on a touchscreen of the smartphone.

After successful activation, acceleration data are collected by the mobile terminal by means of an acceleration sensor integrated into the smartphone. The application then controls the illuminating means according to the detected acceleration data.

In a preferred embodiment, a light source integrated into the mobile terminal is activated if the detected acceleration data exceeds or drops below a specific, representative value for the acceleration. A value which is representative for the acceleration includes the international unit and/or SI unit for acceleration: $\vec{a}=m/s^2$. However, it can include any other representative value for acceleration, for example according to the CGS (Centimetre Gram Second), according to the Planck unit system, or according to the Anglo-American system of measurement.

For example, it can be specified that when a deceleration exceeds a certain value, the light source of the smartphone can be activated. As such, in the exemplary illumination device such as described with reference to FIG. 12, the light emitted by the light source can be fed and/or coupled into the two light guide elements such that the front light and the rear light are illuminated. This has the advantage that all vehicles surrounding the bicycle in traffic are alerted by the activation of the front and back lights, thereby increasing the safety of the cyclist.

Additionally, or alternatively, a strobe light function of the light source can be activated when a deceleration is exceeded. This has the advantage that, in the event that the light source of the smartphone was already activated, the following vehicles in the traffic are alerted by the activation of the strobe function.

In a preferred embodiment, a flashing frequency of the light source can be increased when a detected deceleration increases. This increases the attention of following road users such that the security is increased on the road. Since the light guide elements themselves emit light or are illuminated, the attention of all road users is increased when the flashing frequency is increased.

A combination of these functionalities is possible. Thus, in the event that the light source of the smartphone was not yet activated, when a deceleration is exceeded, only the light source is activated, wherein in the event that the light source of the smartphone was already activated, a strobe light source is activated.

However, the activation of the light source is not only restricted to a deceleration. Any given special event that can be detected by the acceleration sensor can be defined as a trigger to activate the light source of the smartphone. A special event in this context means a special, predetermined and/or prespecifiable event.

In addition, the illumination device can be controlled by storing and or identifying certain Global Positioning System (GPS) positions in the mobile terminal as hazardous position data. For example, GPS positions of large intersections and confusing streets with heavy traffic can be stored as hazardous. This information can be stored by a user entering GPS positions of known dangerous roads and/or intersections into the mobile terminal. This can be done, for example, by means of already-established map applications such as Google Maps, for example, such that the user only has to show the dangerous road or intersection on the map to store the corresponding position in the mobile terminal as dangerous. Alternatively, GPS position data of dangerous roads and intersections can be downloaded to the mobile device. However, the storage of hazardous GPS positions is not limited to these two variants. Rather it can be performed via a plurality of alternative input options. In addition, or alternatively, each intersection can be stored as a hazardous GPS position in the smartphone.

Upon activation of the application, GPS position data can be detected by means of a GPS sensor integrated into the smartphone, and compared with the stored dangerous GPS positions. If a currently captured GPS position corresponds to a stored hazardous GPS position, the light source of the smartphone, and thus also the illumination device, are activated. Alternatively, a strobe frequency light source—and thus the illumination device/the smartphone—can be activated in this case. In another example, the light source can be activated, if it was not activated before reaching the GPS position classified as hazardous. If the light source was already activated before reaching the GPS position, the strobe function of the light source can be activated. This reduces the likelihood that cyclists are overlooked in dangerous, confusing, and/or busy intersections. Thus, the safety of cyclists in road traffic is enhanced.

Alternatively, and/or in addition, a luminous intensity of the light source, and thus the illumination device, can be controlled in response to a specific—that is, predetermined or prespecifiable—threat level of a detected GPS position. In this case, a risk level for each GPS position can be defined in addition to the storage of a GPS position as a hazardous GPS position, as described above. For example, a risk level can be defined as high, medium and low. Accordingly, the luminous intensity can increase if the risk level increases.

Alternatively, and/or additionally, the control of the illumination device also includes the detection of brightness data by means of a light sensor or photocell integrated into the mobile terminal and/or smartphone. If a representative value for the brightness exceeds a specific threshold value, the light source of the smartphone, and thus the illumination device, is activated. A specific threshold value can be a predetermined or prespecifiable threshold.

By way of example, the light source of the smartphone, and thus the illumination device, can be activated if measured brightness data falls below a determined or determinable brightness value, and can be switched off again if the measured brightness data exceeds the determined or determinable brightness value. By switching on the light source, and therefore the illumination device, in the case of the exemplary illumination device as described in FIG. 12 the light emitted from the light source is fed and/or shines and/or is coupled into the two light guide elements such that the headlight and the tail light are illuminated.

This has the advantage that the light can turn on automatically when entering an underpass and turn off automatically when exiting the underpass.

In addition, or alternatively, a light intensity of the light source, and thus also the illumination device, can be controlled according to the detected brightness data, in accordance with specific brightness values. The term "specific brightness value" includes predetermined and/or prespecifiable brightness values. As such, a lower light intensity can be chosen at dawn and dusk, by way of example, than in total darkness. This has the advantage that the battery consumption of the smartphone due to the lower light intensity of the light source at dawn and dusk is less than if the same, full light intensity would be used always.

Additionally or alternatively, the light source of the smartphone can be activated in response to a specific, i.e., predetermined or prespecifiable, time. If, for example, a time detected by the smartphone corresponds to a time with low light, the light source of the smartphone, and thus the illumination device, can be activated. In this case, the smartphone can access, for example, a weather application to obtain information as to what time the sun will rise and/or set, to determine which times are associated with low light. Depending on the data collected by the weather application, the light source of the smartphone can be controlled accordingly.

Additionally or alternatively, a light intensity of the light source, and thus the illumination device, can be controlled according to the detected time. As such, a lower light intensity can be chosen at dawn and dusk, by way of example, than in total darkness. In this case, the smartphone can determine which times correspond to dawn and/or dusk and which times correspond to very low light, according to data captured by a weather application. This has the advantage that the battery consumption of the smartphone due to the lower light intensity of the light source at dawn and dusk is less than if the same, full light intensity would be used always.

A further advantage of using a smartphone as an external light source for the above-described illumination device for a bicycle is that functionalities already integrated into the smartphone can also be used by a cyclist.

As such, the cyclist can use, for example, a navigation app during every bike ride as well. In addition, the smartphone can be used to provide the cyclist with additional trip details, such as travel speed, a distance traveled, elevation changes, calorie consumption, a maximum speed, average speed, etc. These functionalities can be integrated into the application for controlling the illumination device. It can also be contemplated that these features are provided by other, existing applications such as, for example, Runtastic, Runtastic Road Bike etc., while the application used to control the illumination device does so in the background.

The invention claimed is:

1. An illumination device for a vehicle which is operated at least partially by human power, and/or a trailer thereof, comprising:
    at least one light guide element; and
    a mounting device adapted for accommodating an external light source, the mounting device having an opening arranged for aligning a source of light emitted from the external light source with an opening of the at least one light guide element so that light from the external light source can exit the at least one light guide element in such a manner that the emerging light can be used as illumination for a vehicle which is operated at least partially by human power, and/or a trailer thereof,
    wherein the at least one light guide element includes:
        a rigid first light guide element having an intermediate curved portion, an end of the rigid first light guide element coupled to the exterior of the mounting element for receiving the source of light from the opening, and
        a second light guide element coupled within a recess of the intermediate curved portion of the rigid first light guide element in such a manner that light which is fed and/or coupled at least partially into the rigid first light guide element can be received at least partially in the second light guide element.

2. The illumination device of claim 1, wherein the mounting device accommodates a mobile terminal and/or smartphone, and a light source integrated into the mobile terminal and/or smartphone serves as the external light source.

3. The illumination device of claim 2, wherein the mounting device has an opening which-corresponds to the light source integrated into the mobile terminal and/or smartphone.

4. The illumination device of claim 3, further comprising a lens attached at the opening, and/or
    wherein the illumination device has a sleeve configured to attach below the opening of the mounting device adapted for at least partially accommodating the rigid first light guide element.

5. The illumination device of claim 1, wherein the rigid first light guide element is routed in a gooseneck and/or flexible arm such that an exit direction of the light emerging from the rigid first light guide element is modifiable by moving the gooseneck and/or flexible arm.

6. The illumination device of claim 1, further comprising:
    at least one beamforming element attached to the rigid first light guide element such that the beamforming element modifies at least one of a shape, a direction, or a focus of the light emerging from the rigid first light guide element.

7. The illumination device of claim 1, wherein the mounting device is a waterproof enclosure.

8. The illumination device of claim 1, wherein the mounting device is removably fixed to a steering device of the vehicle.

9. A method for controlling an illumination device comprising:
    providing an illumination device comprising:
        at least one light guide element; and
        a mounting device adapted for accommodating a smartphone and/or mobile terminal having a light source, the mounting device having an opening arranged for aligning a source of light emitted from the light source with an opening of the at least one light guide element so that light from the light source can exit the light guide element in such a manner that the emerging light can be used as illumination for a vehicle which is operated at least partially by human power, and/or a trailer thereof,
    wherein the at least one light guide element includes:
        a rigid first light guide element having an intermediate curved portion, and
        a second light guide element coupled within a recess of the intermediate curved portion of the rigid first light guide element in such a manner that light which is fed and/or coupled at least partially into the rigid first light guide element can be received at least partially in the second light guide element, wherein the second light guide element is receivable by and/or removable from the rigid first light guide element via the recess;

detecting acceleration data using an acceleration sensor integrated into the mobile device and/or smartphone accommodated by the mounting device; and controlling and/or regulating the light source according to the acceleration data.

10. The method of claim 9, wherein the controlling and/or regulating of the illumination device further comprises:
if a representative value for the acceleration data exceeds a specific threshold value:
activating the light source to emit light; and/or
activating a blinking or stroboscopic frequency of the light source.

11. The method of claim 9, further comprising:
detecting GPS (Global Positioning System) position data which is representative of a position of the vehicle, using a GPS sensor integrated into the mobile terminal and/or smartphone; and
if the detected GPS position data corresponds to a special, hazardous GPS position:
activating a blinking or stroboscopic frequency of the light source.

12. The method of claim 9, further comprising:
detecting brightness data using a light sensor and/or photocell integrated into the mobile terminal and/or smartphone, and
if a detected representative value for the brightness drops below a specific threshold value:
activating the light source to emit light; and
automatically regulating an emittance intensity of the activated light source according to newly detected brightness data.

13. A computer program product, stored in a tangible medium and executable by at least one processor of a smartphone and/or mobile terminal having a light source to perform an illumination method, the illumination device comprising:
at least one light guide element; and
a mounting device adapted for accommodating the light source, the mounting device having an opening arranged for aligning a source of light emitted from the light source with an opening of the at least one light guide element so that light from the light source can exit the light guide element in such a manner that the emerging light can be used as illumination for a vehicle which is operated at least partially by human power, and/or a trailer thereof,
wherein the at least one light guide element includes:
a rigid first light guide element having an intermediate curved portion, and
a second light guide element coupled within a recess of the intermediate curved portion of the rigid first light guide element in such a manner that light which is fed and/or coupled at least partially into the rigid first light guide element can be received at least partially in the second light guide element, wherein the second light guide element is receivable by and/or removable from the rigid first light guide element via the recess,
the method comprising:
detecting acceleration data using an acceleration sensor integrated into the mobile terminal and/or smartphone accommodated by the mounting device; and
controlling and/or regulating the illumination device according to the acceleration data.

14. The computer program product of claim 13, wherein the controlling and/or regulating of the illumination device further comprises:
if a representative value for the acceleration data exceeds a specific threshold value:
activating the light source to emit light; and/or
activating a blinking or stroboscopic frequency of the light source.

15. The computer program product of claim 13, wherein the method further comprises:
detecting GPS (Global Positioning System) position data which is representative of a position of the vehicle, using a GPS sensor integrated into the mobile terminal and/or smartphone; and
if the detected GPS position data corresponds to a special, hazardous GPS position:
activating a blinking or stroboscopic frequency of the light source.

16. The computer program product of claim 13, wherein the method further comprises:
detecting brightness data using a light sensor and/or photocell integrated into the mobile terminal and/or smartphone, and
if a detected representative value for the brightness drops below a specific threshold value:
activating the light source to emit light; and
automatically regulating an emittance intensity of the activated light source according to newly detected brightness data.

\* \* \* \* \*